(12) United States Patent
Fan et al.

(10) Patent No.: US 7,833,437 B2
(45) Date of Patent: *Nov. 16, 2010

(54) MOISTURE-RESISTANT ELECTROLUMINESCENT PHOSPHOR WITH HIGH INITIAL BRIGHTNESS AND METHOD OF MAKING

(75) Inventors: Chen-Wen Fan, Sayre, PA (US); Tuan A. Dang, Sayre, PA (US); Joan M. Coveleskie, Sayre, PA (US); Frank A. Schwab, Towanda, PA (US); Dale E. Benjamin, Athens, PA (US); David C. Sheppeck, Sayre, PA (US)

(73) Assignee: Global Tungsten & Powders Corp., Towanda, PA (US)

( * ) Notice: Subject to any disclaimer, the term of this patent is extended or adjusted under 35 U.S.C. 154(b) by 363 days.

This patent is subject to a terminal disclaimer.

(21) Appl. No.: 11/622,523

(22) Filed: Jan. 12, 2007

(65) Prior Publication Data

US 2007/0172580 A1 Jul. 26, 2007

Related U.S. Application Data

(60) Provisional application No. 60/766,543, filed on Jan. 26, 2006.

(51) Int. Cl.
*C09K 11/02* (2006.01)
*C09K 11/58* (2006.01)

(52) U.S. Cl. ............... 252/301.6 S; 428/403; 428/404; 427/212; 427/213; 427/215

(58) Field of Classification Search ........... 252/301.6 S; 428/403, 404; 427/212, 213, 215
See application file for complete search history.

(56) References Cited

U.S. PATENT DOCUMENTS

| | | | |
|---|---|---|---|
| 5,009,808 A | 4/1991 | Reilly et al. | |
| 5,080,928 A | 1/1992 | Klinedinst et al. | |
| 5,220,243 A | 6/1993 | Klinedinst et al. | |
| 5,244,750 A | 9/1993 | Reilly et al. | |
| 5,593,782 A | 1/1997 | Budd | 428/403 |
| 5,643,496 A | 7/1997 | Brese et al. | |
| 5,702,643 A | 12/1997 | Reddy et al. | |
| 6,064,150 A | 5/2000 | Klinedinst et al. | |
| 6,090,311 A | 7/2000 | Brese et al. | |

(Continued)

FOREIGN PATENT DOCUMENTS

EP     0 455 401 B2     7/1996

(Continued)

OTHER PUBLICATIONS

Office Action mailed Sep. 30, 2009 for U.S. Appl. No. 11/622,633.*

(Continued)

*Primary Examiner*—C. Melissa Koslow
(74) *Attorney, Agent, or Firm*—Ballard Spahr LLP

(57) ABSTRACT

The present invention is an electroluminescent phosphor wherein each individual phosphor particle is encapsulated in an inorganic coating applied by an atomic layer deposition (ALD) coating method. In a preferred embodiment, the coating is aluminum oxyhydroxide. The encapsulated phosphor shows an extreme insensitivity to atmospheric moisture and suffers only minor loss of initial brightness in lamps.

18 Claims, 2 Drawing Sheets

U.S. PATENT DOCUMENTS

| | | |
|---|---|---|
| 6,309,700 B1 | 10/2001 | Fan et al. |
| 6,456,002 B1 | 9/2002 | Klinedinst et al. .......... 313/503 |
| 6,613,383 B1 | 9/2003 | George et al. |
| 6,702,959 B2 | 3/2004 | Fan et al. ............... 252/301.65 |
| 6,713,177 B2 | 3/2004 | George et al. |
| 6,733,826 B2 | 5/2004 | Fan et al. .................... 427/213 |
| 6,743,475 B2 | 6/2004 | Skarp et al. ............ 427/255.31 |
| 6,849,297 B1 | 2/2005 | Fan et al. .................... 427/215 |
| 6,913,827 B2 | 7/2005 | George et al. |
| 7,001,665 B2 | 2/2006 | Klinedinst ................. 428/403 |
| 7,498,053 B2 | 3/2009 | Lim et al. ..................... 427/66 |
| 2003/0172872 A1 | 9/2003 | Thakur et al. ............... 118/715 |
| 2007/0298250 A1* | 12/2007 | Weimer et al. .............. 428/336 |

FOREIGN PATENT DOCUMENTS

| | | |
|---|---|---|
| WO | WO 01/36559 | 5/2001 |
| WO | WO 01/82390 | 11/2001 |

OTHER PUBLICATIONS

Office Action mailed Jan. 15, 2010 for U.S. Appl. No. 11/622,633.*
Applicants' reposne to the Office Action mailed Sep. 30, 2009 for U.S. Appl. No. 11/622,633, dated Oct. 20, 2009.*
Front page, search report and written opinion for WO 2007/087479, Aug. 2, 2007.*
Front page, search report and written opinion for WO 2007/087480, Aug. 2, 2007.*

* cited by examiner

MOISTURE-RESISTANT ELECTROLUMINESCENT PHOSPHOR WITH HIGH INITIAL BRIGHTNESS AND METHOD OF MAKING

CROSS REFERENCES TO RELATED APPLICATIONS

This application claims the benefit of U.S. Provisional Application No. 60/766,543, filed Jan. 26, 2006.

TECHNICAL FIELD

This invention relates to electroluminescent phosphors and more particularly to electroluminescent phosphors that have been treated to be moisture resistant. Still more particularly, this invention relates to electroluminescent phosphors having greatly reduced moisture-induced degradation and high initial brightness.

BACKGROUND OF THE INVENTION

Electroluminescent (EL) lamps may be divided generally into two types: (1) thin-film EL lamps that are made by depositing alternating films of a phosphor and dielectric material on a rigid glass substrate usually by a vapor deposition technique such as CVD or sputtering; and (2) thick-film EL lamps which are made with particulate materials that are dispersed in resins and coated in alternating layers on sheets of plastic. In the latter case, the thick-film electroluminescent lamps may be constructed as thin, flexible lighting devices thereby making them suitable for a greater range of applications.

A cross-sectional illustration of a conventional thick-film EL lamp is shown in FIG. 1. The lamp 2 has two dielectric layers 20 and 22. A first conductive material 4, such as graphite, coated on a plastic film 12b forms a first electrode of the lamp 2 (this electrode could also comprise a metal foil); while a thin layer of a transparent conductive material 6, such as indium tin oxide, coated on a second plastic film 12a forms a second electrode. Sandwiched between the two conductive electrodes 4 and 6 are two layers 20 and 22 of dielectric material 14 which may be, for example, cyanoethyl cellulose, cyanoethyl starch, poly-(methylmethacrylate/ethyl acrylate) and/or a fluorocarbon polymer. Adjacent to the first electrode 4 is a layer of dielectric material 14 in which are embedded particles of a ferroelectric material 10, preferably barium titanate. Adjacent to the second electrode 6 is a layer of dielectric material 14 in which are embedded particles of an electroluminescent phosphor 8. When an alternating voltage is applied to the electrodes, visible light is emitted from the phosphor.

The electroluminescent phosphors available for thick-film EL lamps are primarily comprised of zinc sulfide that has been doped with various activators, e.g., Cu, Au, Ag, Mn, Br, I, and Cl. Examples of zinc sulfide-based EL phosphors are described in U.S. Pat. Nos. 5,009,808, 5,702,643, 6,090,311, and 5,643,496. Preferred EL phosphors include ZnS:Cu phosphors which may be co-doped with Cl and/or Mn.

The brightness of electroluminescent phosphors, and in particular the ZnS:Cu phosphors, significantly deteriorates due to the presence of moisture during the application of the electric field. It has been reported that the deterioration of the brightness of the zinc sulfide-based phosphors is caused by increasing sulfur vacancy, which is produced by the following reaction:

$$ZnS + 2H_2O \rightarrow SO_2 + Zn + 2H_2$$

Sulfur escapes from the phosphor in the form of $SO_2$; as a result, sulfur vacancy and zinc are left in the phosphor.

Therefore, it is important to incorporate moisture protection measures to prolong the light emission of EL lamps. Typically, the individual particles of EL phosphors are encapsulated with an inorganic coating in order improve their resistance to moisture-induced degradation. Examples of such coatings are described in U.S. Pat. Nos. 5,220,243, 5,244,750, 6,309,700, and 6,064,150. These inorganic coatings are formed via a chemical vapor deposition (CVD) reaction while the phosphor particles are suspended within a gas-fluidized bed. In general, a thin yet continuous coating is deposited upon the surface of the phosphor particles, thereby protecting them from the effects of atmospheric moisture.

A preferred coating for EL phosphors results from the hydrolysis of trimethylaluminum (TMA). The hydrolyzed TMA coating and CVD process are described in U.S. Pat. Nos. 5,080,928 and 5,220,243 which are incorporated herein by reference. The composition of the hydrolyzed TMA coating is believed to be primarily aluminum oxyhydroxide (AlOOH), but may be varied in composition between aluminum oxide and aluminum hydroxide depending upon the reaction conditions. For the sake of convenience, the composition of the hydrolyzed TMA coating will be referred to herein as aluminum oxyhydroxide (AlOOH) although it is to be understood that this also encompasses the full range of compositions from aluminum oxide ($Al_2O_3$) to aluminum hydroxide ($Al(OH)_3$). The reaction of TMA and water can be described as follows:

$$Al(CH_3)_3 + (3+n)/2\, H_2O \rightarrow AlO_{(3-n)/2}(OH)_n + 3CH_4$$
$$(0 \leq n \leq 3)$$

FIG. 2 is a graph of the 100-hour maintenance as a function of aluminum content (coating thickness) for conventional AlOOH CVD-coated EL phosphors operated in an EL lamp at 50° C., 90% rel. humidity. As can be seen, the coating thickness corresponding to about 3.8 wt. % aluminum (as a percentage of the total coated phosphor weight) represents in the case of the conventional CVD method the coating thickness for the optimal combination of retained initial brightness and high moisture resistance. As used herein, the 100-hour maintenance is defined as the 100-hour light output divided by 0-hour light output and multiplied by 100%, (100-hour/0-hour)×100%. Compared to the uncoated phosphor, the CVD-encapsulated EL phosphor always suffers a significant loss in initial brightness as a result of the coating process. It is suspected that the decrease may be caused by a decrease in the electric field inside the phosphor particles due to the presence of the outer coating.

SUMMARY OF THE INVENTION

As used herein, the term initial brightness (IB) refers to the brightness of the phosphor in an electroluminescent lamp when the lamp is operated for the very first time. A brief period of a few minutes may elapse in order to allow for the measurement to be made and the light output of the lamp to be stabilized. This is also referred to as the 0-hour brightness. Because of the rapid decrease in brightness caused by moisture-induced degradation, it is preferred to laminate the EL lamp containing the uncoated phosphor in a moisture resistant package in order to make the initial brightness measurement. The retained initial brightness (RIB) for a coated EL phosphor is expressed as a percentage and determined with respect to the initial brightness of the same EL phosphor in its uncoated state when operated in an EL lamp under the same conditions; RIB=(IB(coated)/IB(uncoated))×100%. Preferably, the retained initial brightness for the coated EL phosphors of this invention is at least 95%.

It has been discovered that atomic layer deposition (ALD) is able to provide a thinner coating on the EL phosphor particles than the conventional CVD method while at the same time maintaining an equivalent level of moisture protection and at a higher level of initial brightness. ALD is an attractive thin-film deposition technique because it allows atomic level control over the deposition process. ALD coatings have many excellent features like conformality, uniformity, repeatability and accurate thickness control. In fact, ALD is a special type of CVD that uses two chemical vapor precursors that are periodically injected into the deposition system in such a manner that both are not present in the reactor in the vapor phase at the same time. The purpose for doing this is to force the precursors react on the substrate and not in the gas phase during ALD deposition. Examples of ALD coating processes are described in U.S. Pat. Nos. 6,913,827 and 6,613,383 which are incorporated herein by reference.

In an ALD deposition process, one precursor is adsorbed on the surface as a monolayer; the system is then purged to remove the excess precursor; the second precursor is injected to react with the adsorbed material; and then the system is purged again. Carrier gas flow (typically $N_2$) and vacuum pumping is used to purge the system after each precursor pulse. The ALD deposition cycle is repeated, with a dosing time for each precursor on the order of 10 to 20 seconds, until the required film thickness is achieved. This leads to very uniform deposition over very complex surfaces such as the high-aspect-ratio features on semiconductor devices. The reaction is self-limiting and the growth rates typically are on the order of 0.1 to 1.5 Å per cycle resulting in very defect-free films. Since the coating is essentially formed one monolayer at a time, ALD is more likely to achieve a denser coating than prior CVD methods.

It has been demonstrated for an ALD-applied aluminum oxyhydroxide coating that a coating thickness of at least about 900 Å, and more preferably about 1200 Å, is needed to effectively protect an EL phosphor from the moisture-induced degradation. It takes on the order of 800 ALD deposition cycles to achieve a thickness of about 1200 Å. Preferably, the retained initial brightness of the ALD-coated phosphor is at least 95% and the 100-hour maintenance is at least 60% when operated in an EL lamp at 50° C. and 90% relative humidity. More preferably, the retained initial brightness is at least 95% and the 100-hour maintenance is at least 75% when operated in an EL lamp at 50° C. and 90% relative humidity. Although AlOOH is a preferred coating, it is expected that other inorganic coatings may be applied by ALD on electroluminescent phosphors with similar benefits. Such other inorganic coatings include, but are not limited to, aluminum nitride, silicon dioxide and titanium dioxide.

DETAILED DESCRIPTION OF THE INVENTION

Figure 1:
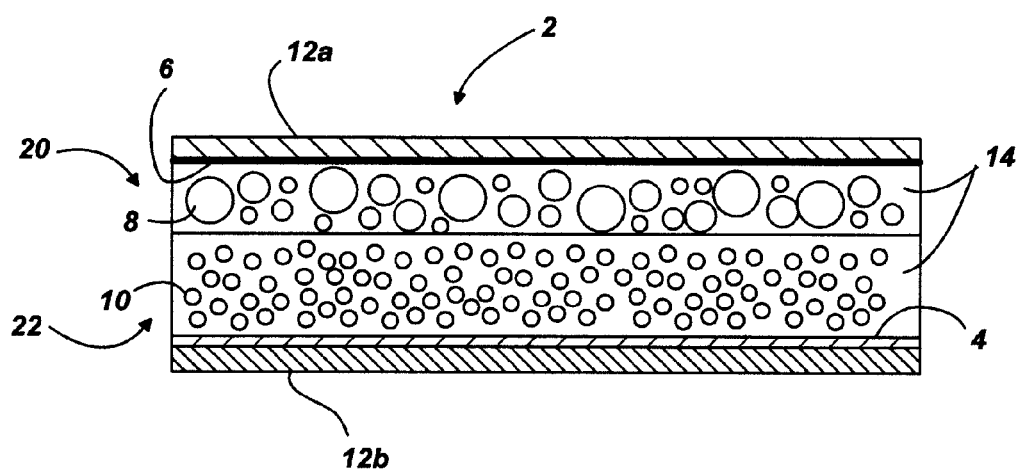
FIG. 1 is a cross-sectional illustration of a conventional thick-film EL lamp.
Figure 2:
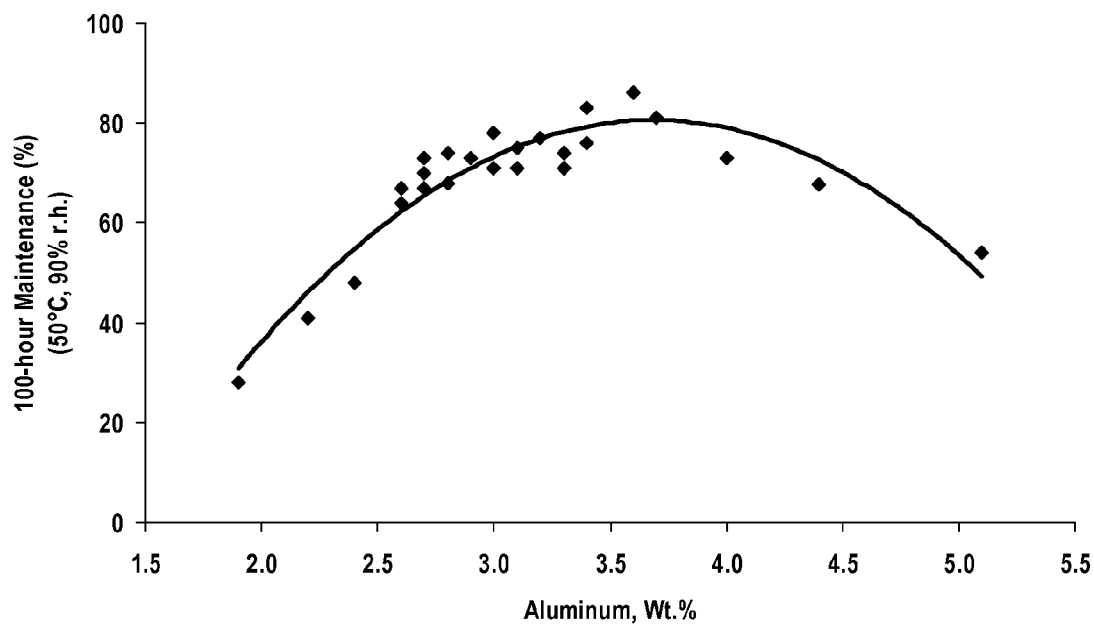
FIG. 2 is a graph of the 100-hour maintenance as a function of aluminum content for conventional CVD-coated EL phosphors operated in an EL lamp at 50° C., 90% rel. humidity.

For a better understanding of the present invention, together with other and further objects, advantages and capabilities thereof, reference is made to the following disclosure and appended claims taken in conjunction with the above-described drawings.

The present invention is an electroluminescent phosphor wherein each individual phosphor particle is encapsulated in an inorganic coating applied by an atomic layer deposition (ALD) coating method. In a preferred embodiment, the coating is aluminum oxyhydroxide. The encapsulated phosphor shows an extreme insensitivity to atmospheric moisture and suffers only minor loss of initial brightness in lamps.

In particular, the method of this invention involves EL phosphor particles being coated with an inorganic film using an ALD method in a fluidized bed. In a preferred method, the ALD coating is formed by introducing into a fluidized bed of phosphor particles a series of alternating doses of vaporized trimethylaluminum (TMA) and water vapor in an ABAB ... sequence to deposit an aluminum oxyhydroxide film essentially one monolayer at a time on the surface of the phosphor particles. These two precursors are pulsed sequentially in an inert carrier gas into the coating reactor with a purge between the pulses to prevent vapor phase reactions. The fluidized bed reactor is maintained at 450K and 1 Torr of pressure. Since each pair of precursor pulses (one cycle) produces approximately a monolayer of film, the thickness of the resulting film may be precisely controlled by the number of deposition cycles.

The coating thickness can be correlated with the amount of aluminum deposited on the phosphor. The coating thickness is estimated by using Sputtered Neutral Mass Spectroscopy (SNMS) measurements and a standard $Ta_2O_5$ film as a reference material. To meet the 100-hour maintenance requirement for EL lamps under 50° C./90% relative humidity conditions, it is preferred that the ALD process be continued for about 800 cycles until the total amount of aluminum deposited reaches at least 1.6 wt. %.

The present invention will be described in further detail with reference to the following examples. However, it should be understood that the present invention is by no means restricted to such specific examples.

Thick-film electroluminescent test lamps are constructed in the following general manner. Phosphors are mixed with a binder (DuPont Microcircuit Materials Luxprint 8155 binder). The percentage of phosphor in the liquid binder is 60 wt. %. The phosphor suspension is screen-printed onto a 0.0065-0.0075 in.-thick PET film having a transparent, conductive layer of indium-tin oxide, for example OC-200 available from CP Films. The polyester screen has 137 or 140 threads per inch. After drying, a dielectric layer is formed by two applications of a barium titanate-filled dielectric ink (DuPont Microcircuit Materials Luxprint® 8153 Electroluminescent Dielectric Insulator) which applied over the phosphor layer and dried between applications. After drying the dielectric layer, a rear carbon electrode (DuPont Microcircuit Materials Luxprint® 7144 Carbon Conductor) is applied over the dielectric layer. The preferred method for applying the layers to the electroluminescent lamp is screen printing, also referred to as "silk-screening." However other coating techniques such as draw blade coating and roll-to-roll coating may also be used successfully. After drying, the electroluminescent lamp is ready for brightness and maintenance tests. Lamps tested in a humidity chamber require the rear carbon electrode to be covered in order to prevent liquid water from entering the lamp. In this case, a thin pressure-sensitive adhesive tape (3M Scotch 821 tape) is applied to the carbon electrode.

EXAMPLE 1

About 200 grams of a green-emitting ZnS:Cu electroluminescent phosphor (Type 728, OSRAM SYLVANIA Products Inc., Towanda, Pa.) was charged into a vibrated fluidized bed reactor for ALD coating. The fluidized bed reactor was a stainless steel column with a porous metal disc as the gas distributor. High-purity nitrogen was used as the fluidizing gas. The entire reactor was surrounded by a clamshell-type furnace and reactor temperature was maintained at 450K. Trimethylaluminum (TMA) and deionized water were used as precursors and the reaction split into two self-limiting half-reactions to deposit an aluminum oxyhydroxide coating. A series of pneumatically activated valves controlled the automatic and sequential dosing of precursors during the coating cycles. Both precursors were delivered via their vapor pressures and the system was evacuated and kept at low pressure of 1.0 Torr at all times. After each precursor dose, the system was flushed with nitrogen to eliminate unreacted species as well as any methane formed during reaction. Because there are filters located at the top of the reactor to reduce elutriation, a blowback step is used to blow collected powders off the filters after each cycle. The phosphor was coated for 100 coating cycles.

EXAMPLE 2

The phosphor in this example was prepared as in Example 1, except that the number of coating cycles was increased to 300.

EXAMPLE 3

The phosphor in this example was prepared as in Example 1, except that the number of coating cycles was increased to 600.

A conventional CVD-coated phosphor made with the same uncoated phosphor used in Examples 1-3 was prepared as a control to compare with ALD-coated samples. The CVD coating was applied by introducing both the vaporized TMA and water vapor precursors simultaneously into a fluidized bed reactor, which was maintained at atmospheric pressure and 450K.

Thick-film electroluminescent test lamps were made containing uncoated phosphor as well as the encapsulated phosphors. The control lamps containing the uncoated phosphor were specially packaged in ACLAR, a water-impermeable, transparent film supplied by Honeywell Inc., so that the moisture sensitivity of the uncoated phosphor could be minimized. Identical lamps containing encapsulated phosphors were operated at 100 V and 400 Hz for 100 hours in two environments. In Lamp Test #1, the conditions were 21° C. and 50% relative humidity. For Lamp Test #2, accelerated environmental testing was conducted in a humidity chamber at 50° C. and 90% relative humidity. The test results for these lamps are presented in Table 1. The aluminum content of ALD-coated phosphors, expressed as a percentage of the total coated phosphor weight (wt. % Al), and the approximate coating thickness in angstroms are also provided.

Figure 3:
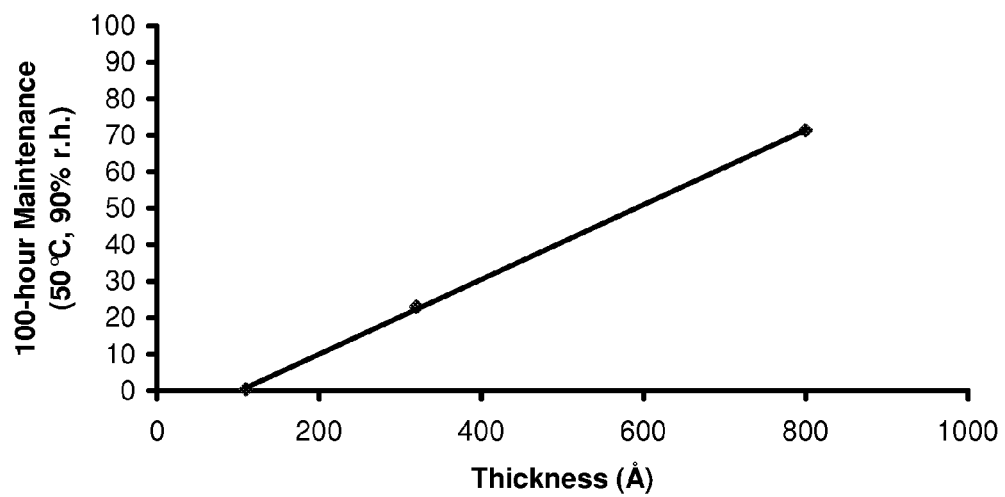
FIG. 3 is a graph of 100-hour maintenance versus coating thickness for the coated phosphors made by ALD method of this invention.

As shown in Table 1, the 100-hour maintenance of the ALD-coated EL phosphors increases with increasing coating thickness which is achieved by increasing the number of coating cycles. However, the 100-hour maintenance of the 600-cycle ALD-coated phosphor is still about 10% lower than that of standard CVD-coated phosphor in the accelerated environmental tests (50° C., 90% r.h.). By plotting the ALD coating thickness versus the 100-hour maintenance as in FIG. 3, it is estimated that an ALD-coated phosphor with a coating thickness of 900 Å may achieve a similar 100-hour maintenance performance as the CVD-coated control.

TABLE 1

| Lamp Test | Lamp Attribute | Uncoated phosphor control | std. CVD coated control | ALD 100 cycles | ALD 300 cycles | ALD 600 cycles |
|---|---|---|---|---|---|---|
| | CIE x coord. | 0.178 | 0.179 | 0.180 | 0.177 | 0.179 |
| | CIE y coord. | 0.453 | 0.457 | 0.461 | 0.456 | 0.456 |
| 1 | 0 hr, cd/m$^2$ | 106.2 | 84.5 | 100.5 | 101.9 | 102.3 |
| 1 | Retained Initial Brightness 0 hr, % | 100 | 79.6 | 94.6 | 96.0 | 96.3 |
| 1 | 24 hr, cd/m$^2$ | 97.4 | 78.4 | 67.2 | 95.0 | 95.6 |
| 1 | 100 hr, cd/m$^2$ | 88.6 | 73.1 | 37.1 | 77.9 | 89.6 |
| 2 | 0 hr, cd/m$^2$ | — | 76.4 | 90.8 | 90.8 | 99.0 |
| 2 | 100 hr, cd/m$^2$ | — | 61.7 | 0.3 | 20.9 | 70.6 |
| 2 | Maint. % 100 hr/0 hr | — | 80.8 | 0.3 | 23.0 | 71.3 |
| | Al, coating wt. % | — | 3.6 | 0.18 | 0.45 | 1.2 |
| | SNMS Coating Thickness (Å) | — | 2080 | 110 | 320 | 800 |

EXAMPLE 4

The phosphor in this example was prepared as in Example 1, except that the number of coating cycles was increased to 800 and the phosphor was a different green-emitting ZnS:Cu electroluminescent phosphor (Type 729, OSRAM SYLVANIA Products Inc., Towanda, Pa.). The lamp data and analysis of this ALD-coated phosphor and a CVD-coated control made from the same phosphor are shown and compared in Table 2. The coating thickness for the CVD-coated control (3.8 wt. % Al) is considered to be the optimal thickness for this phosphor in terms of high maintenance and retained initial brightness.

By increasing the number of coating cycles to 800, the aluminum coating weight on ALD-coated phosphor was increased to 1.6 wt. %. Based on the SNMS measurements, the AlOOH coating thickness on the 800-cycle phosphor is estimated to be 1160 Å, which is about half thickness of standard CVD-coated EL phosphor. This ALD-coated phosphor and the CVD-coated control have nearly equal 100-hour maintenance in lamps. However, ALD-coated EL phosphor retained about 96% of the initial brightness while CVD-coated phosphor retained only 80% of the initial brightness.

TABLE 2

| Lamp Test | Lamp Attribute | Uncoated phosphor control | std. CVD coated control | ALD 800 cycles |
|---|---|---|---|---|
|  | CIE x coord. | 0.181 | 0.184 | 0.180 |
|  | CIE y coord. | 0.464 | 0.478 | 0.462 |
| 1 | 0 hr, cd/m$^2$ | 100.7 | 80.4 | 96.4 |
| 1 | Retained Initial Brightness 0 hr, % | 100 | 79.8 | 95.7 |
| 1 | 24 hr, cd/m$^2$ | 92.8 | 74.5 | 90.0 |
| 1 | 100 hr, cd/m$^2$ | 85.5 | 69.2 | 83.1 |
| 2 | 0 hr, cd/m$^2$ | — | 74.6 | 90.3 |
| 2 | 100 hr, cd/m$^2$ | — | 56.8 | 69.4 |
| 2 | Maint. % 100 hr/0 hr | — | 76.1 | 76.9 |
|  | Al, coating wt. % | — | 3.8 | 1.6 |
|  | SNMS Coating Thickness (Å) | — | 2000 | 1160 |

While there has been shown and described what are at the present considered the preferred embodiments of the invention, it will be obvious to those skilled in the art that various changes and modifications may be made therein without departing from the scope of the invention as defined by the appended claims.

We claim:

1. An electroluminescent phosphor, comprising: individual particles of a zinc sulfide-based electroluminescent phosphor wherein each particle is encapsulated in an inorganic coating, the phosphor exhibiting a retained initial brightness of at least 95% and a 100-hour maintenance of at least 60% when incorporated in an electroluminescent lamp that is operated at 100V and 400 Hz in a 50° C., 90% relative humidity environment.

2. The phosphor of claim 1 wherein the 100-hour maintenance is at least 75%.

3. The phosphor of claim 1 wherein the electroluminescent phosphor is ZnS:Cu.

4. The phosphor of claim 1 wherein the inorganic coating is aluminum oxyhydroxide.

5. The phosphor of claim 4 wherein the 100-hour maintenance is at least 75%.

6. The phosphor of claim 4 wherein the electroluminescent phosphor is ZnS:Cu.

7. A method for encapsulating an electroluminescent phosphor comprising:
    (a) forming a fluidized bed of electroluminescent phosphor particles;
    (b) introducing a first vapor phase precursor into the fluidized bed;
    (c) purging the fluidized bed;
    (d) introducing a second vapor phase precursor into the fluidized bed to react with the first precursor and form an inorganic coating on the phosphor particles;
    (e) purging the fluidized bed; and
    (f) repeating steps (a) through (e) until a final coating thickness of at least about 900 Å is reached.

8. The method of claim 7 wherein the first or second vapor phase precursor is either vaporized trimethylaluminum or water vapor and the coating is aluminum oxyhydroxide.

9. The method of claim 7 wherein the final coating thickness is at least about 1200 Å.

10. The method of claim 9 wherein the final coating thickness in step (f) is reached after about 800 cycles of repeating steps (a) through (e).

11. A method for encapsulating an electroluminescent phosphor comprising:
    (a) forming a fluidized bed of ZnS:Cu electroluminescent phosphor particles;
    (b) introducing a vaporized trimethylaluminum into the fluidized bed;
    (c) purging the fluidized bed;
    (d) introducing water vapor into the fluidized bed to react with the trimethylaluminum and form an aluminum oxyhydroxide coating on the phosphor particles;
    (e) purging the fluidized bed; and
    (f) repeating steps (a) through (e) until a final coating thickness of at least about 900 Å is reached.

12. The method of claim 11 wherein the final coating thickness is at least about 1200 Å.

13. The method of claim 12 wherein the final coating thickness in step (f) is reached after about 800 cycles of repeating steps (a) through (e).

14. The method of claim 11 wherein the vaporized trimethylaluminum is introduced in step (d) and the water vapor is introduced in step (b).

15. The method of claim 14 wherein the final coating thickness is at least about 1200 Å.

16. The method of claim 15 wherein the final coating thickness in step (f) is reached after about 800 cycles of repeating steps (a) through (e).

17. A coated electroluminescent phosphor, comprising: individual particles of a zinc sulfide-based electroluminescent phosphor wherein each particle is encapsulated in an aluminum oxyhydroxide coating, the phosphor exhibiting a retained initial brightness of at least 95% and having a moisture resistance equivalent to a CVD-coated phosphor having an aluminum oxyhydroxide coating wherein the aluminum content of the CVD-coated phosphor is 3.8 weight percent.

18. The coated phosphor of claim 17 wherein the aluminum content of the coated electroluminescent phosphor is 1.6 weight percent.

* * * * *